(12) United States Patent  
Roth

(10) Patent No.: US 6,564,700 B2
(45) Date of Patent: May 20, 2003

(54) APPARATUS FOR PRODUCING A TARGET PH IN A FOODSTUFF

(75) Inventor: Eldon Roth, Dakota Dunes, SD (US)

(73) Assignee: Freezing Machines, Inc., Dakota Dunes, SD (US)

( * ) Notice: Subject to any disclaimer, the term of this patent is extended or adjusted under 35 U.S.C. 154(b) by 0 days.

(21) Appl. No.: 10/124,561

(22) Filed: Apr. 17, 2002

(65) Prior Publication Data

US 2002/0110624 A1 Aug. 15, 2002

Related U.S. Application Data

(62) Division of application No. 09/579,779, filed on May 26, 2000, now Pat. No. 6,379,728.

(51) Int. Cl.[7] .............................. A23L 1/00; A23L 3/00
(52) U.S. Cl. ............................ 99/486; 99/325; 99/348; 99/483; 99/493; 99/516; 99/534; 241/38; 241/62; 366/132; 366/140
(58) Field of Search ........................... 99/325–331, 348, 99/467, 468, 472, 484, 485–492, 493, 510, 516, 534–536; 241/38–43, 62, 95, 292, 299, 301; 426/231, 646, 319, 332, 518, 630, 632, 634, 656, 807; 366/132, 140–142

(56) References Cited

U.S. PATENT DOCUMENTS

| | | | |
|---|---|---|---|
| 3,023,109 A | | 2/1962 | Hines |
| 3,681,851 A | * | 8/1972 | Fleming .................... 241/38 X |
| 3,711,392 A | * | 1/1973 | Metzger .................... 241/62 X |
| 3,875,310 A | * | 4/1975 | Rawlings et al. ........ 426/807 X |
| 4,332,823 A | | 6/1982 | Buemi |
| 4,419,414 A | * | 12/1983 | Fischer et al. ........... 241/299 X |
| 5,405,630 A | * | 4/1995 | Ludwig ..................... 99/348 X |
| 5,558,774 A | * | 9/1996 | Tonelli et al. ............. 99/534 X |
| 5,564,332 A | * | 10/1996 | Ludwig ..................... 99/535 X |
| 5,762,993 A | * | 6/1998 | Gundlach et al. ........... 426/646 |
| 5,772,721 A | * | 6/1998 | Kaemzadeh .............. 241/38 X |
| 5,871,795 A | | 2/1999 | Roth |
| 6,142,067 A | | 11/2000 | Roth |
| 6,389,939 B1 | * | 5/2002 | Roth ........................ 99/484 X |
| 6,406,730 B1 | * | 6/2002 | Banyard et al. .......... 99/371 X |

FOREIGN PATENT DOCUMENTS

| | | |
|---|---|---|
| DE | 19752249 A | 4/1999 |
| JP | 62-196082 | 12/1976 |
| RU | 528923 | 12/1976 |

* cited by examiner

*Primary Examiner*—Timothy F. Simone
(74) *Attorney, Agent, or Firm*—Russell D. Culbertson; Shaffer & Culbertson, L.L.P.

(57) ABSTRACT

A stream (A) of first foodstuff has a first pH and a stream (B) of second foodstuff has second pH. The first pH and second pH are oppositely related to a third or target pH for the foodstuff such that one pH level is above the target level while the other pH level is below the target level. The two streams (A) and (B) are combined in a proportion to produce a combined or third foodstuff at the target pH. One or both of the first pH and second pH are sensed or otherwise determined, preferably on a continuous basis, and then these pH values are used to determine the proportion at which the stream of first foodstuff and stream of second foodstuff are combined and mixed. Particularly, the pH modification can be loosely controlled to produce an over-modification in the first foodstuff and then the stream (B) of second foodstuff may be combined with the stream (A) first foodstuff to produce a stream (C) of material having the target pH.

18 Claims, 2 Drawing Sheets

APPARATUS FOR PRODUCING A TARGET PH IN A FOODSTUFF

CROSS-REFERENCE TO RELATED APPLICATION

This application is a divisional of U.S. patent application No. 09/579,779 entitled "METHOD FOR PRODUCING A TARGET pH IN A FOODSTUFF," filed May 26, 2000, now U.S. Pat. No. 6,379,728. The Applicant claims the benefit of this earlier application under 35 U.S.C. 120, and hereby incorporates the entire content of this earlier application herein by this reference.

TECHNICAL FIELD OF THE INVENTION

This invention relates to foodstuff processing. More particularly, the invention relates to an apparatus for producing a desired, target pH in a foodstuff.

BACKGROUND OF THE INVENTION

Foodstuff processing systems may utilize a pH modification step as part of an overall process. The pH modification may entail adding a pH modifying material to a foodstuff and then mixing the foodstuff and pH modifying material to produce a pH-modified foodstuff. U.S. Pat. No. 5,871,795, for example, discloses an apparatus and method for adding ammonia to a foodstuff to increase the pH of the foodstuff. It is also possible to modify the pH of a foodstuff by adding a pH reducing material to the foodstuff. Carbon dioxide may serve as a pH reducing material for certain foodstuffs. U.S. patent application Ser. No. 09/286,699 entitled "APPARATUS FOR TREATING AMMONIATED MEATS," now U.S. Pat. No. 6,142,067, shows an apparatus and method for treating ammoniated meats, that is, meats which have been exposed to ammonia. The apparatus disclosed in this patent includes an ammonia contactor and a mixing arrangement. Ammonia is added to an initial foodstuff in the contactor and then distributed throughout the foodstuff in the mixing arrangement. This combination of ammonia contactor and mixing arrangement produces a foodstuff having a generally uniform increased pH throughout the material.

The foodstuff pH modification shown in U.S. patent application Ser. No. 09/286,699 now U.S. Pat. No. 6,142,067 must be carefully controlled to produce the desired result. Over modifying the pH in the foodstuff may affect the taste or other qualities of the foodstuff. On the other hand, insufficient pH change in the foodstuff may diminish the effectiveness of the overall foodstuff processing system.

SUMMARY OF THE INVENTION

The present invention provides an apparatus for modifying the pH of a foodstuff. More particularly, the invention provides a pH modifying apparatus which facilitates improved pH control capability.

The present apparatus utilizes a first foodstuff at a first pH and a second foodstuff at a second pH which is different from the first pH. The first pH and second pH are both related to a third or target pH for the foodstuff. More particularly, the first pH is either higher or lower than the target pH, while the second pH bears the opposite relation to the target pH. For example, where the first pH is higher than the target pH, the second pH is lower than the target pH. Alternatively, where the first pH is lower than the target pH, the second pH is higher than the target pH. The present apparatus combines the first foodstuff with the second foodstuff in a proportion to produce a combined or third foodstuff at the target pH.

The proportion at which the first foodstuff and second foodstuff is combined is determined by the values of the first pH and second pH. The first pH and second pH are sensed or otherwise determined, preferably on a continuous basis, and then these pH values are used to determine the proportion at which the first foodstuff and second foodstuff are combined and mixed. For example, the first foodstuff may comprise the foodstuff to which a pH modifying material such as ammonia has been added. The pH modification can be loosely controlled to produce an over modification in the first foodstuff and then the second foodstuff may be combined with the first foodstuff according to the invention to produce a combined foodstuff having the target pH.

The apparatus according to the invention may operate in either a continuous or batch mode. In continuous operation, the invention is particularly advantageous because it facilitates improved control over the pH modification, and a means for moderating an over modified pH without interrupting the continuous process. The present method of modifying pH is helpful in a batch operation in that it allows a component in a mixed foodstuff to be used to produce a more desirable pH in the mixed foodstuff.

An apparatus according to the invention includes an initial foodstuff supply arrangement and a pH modifying arrangement. The initial foodstuff supply arrangement provides an initial foodstuff to the pH modifying arrangement. A pH modifying material is then added to the initial foodstuff in the pH modifying arrangement, and the foodstuff is mixed to produce a uniform, pH-modified foodstuff. This pH-modified foodstuff may comprise the first foodstuff described above and set out in the following claims.

The apparatus according to the invention also includes a second foodstuff supply arrangement and a combining arrangement. The second foodstuff supply arrangement provides the second foodstuff, which may, for example, comprise a foodstuff in which the pH has not been modified by the addition of a pH modifying material. In any case, the combining arrangement combines the pH-modified, first foodstuff with the second foodstuff in the proportion required to produce the third foodstuff having the target pH. This combined foodstuff is preferably mixed together thoroughly with a suitable mixing device to ensure a uniform pH throughout the material.

The pH of the pH-modified foodstuff may be sensed or otherwise determined downstream from the pH modifying arrangement and the sensed pH may be used to control a flow rate of one or both the first and second foodstuff into the combining arrangement. Also, the sensed pH may be used to control the addition of pH modifying material in the pH modifying arrangement.

The apparatus according to the invention provides an important control function for continuous processes which utilize a pH modifying step. Although it may be difficult or undesirable to precisely control the pH modification by addition of a pH modifying material, the invention compensates by allowing precise control over the proportion at which the two foodstuff streams are combined. Furthermore, the apparatus according to the invention may provide benefits in the way the target pH is obtained. In particular, a pH modifying step in a foodstuff processing system may be more effective by first over modifying the pH of a foodstuff and then bringing the pH back to a target pH level. Also, the invention allows an untreated foodstuff to obtain the benefit of a pH modification without having to add pH modifying material directly to the foodstuff.

These and other objects, advantages, and features of the invention will be apparent from the following description of the preferred embodiments, considered along with the accompanying drawings.

DESCRIPTION OF PREFERRED EMBODIMENTS

Figure 1:
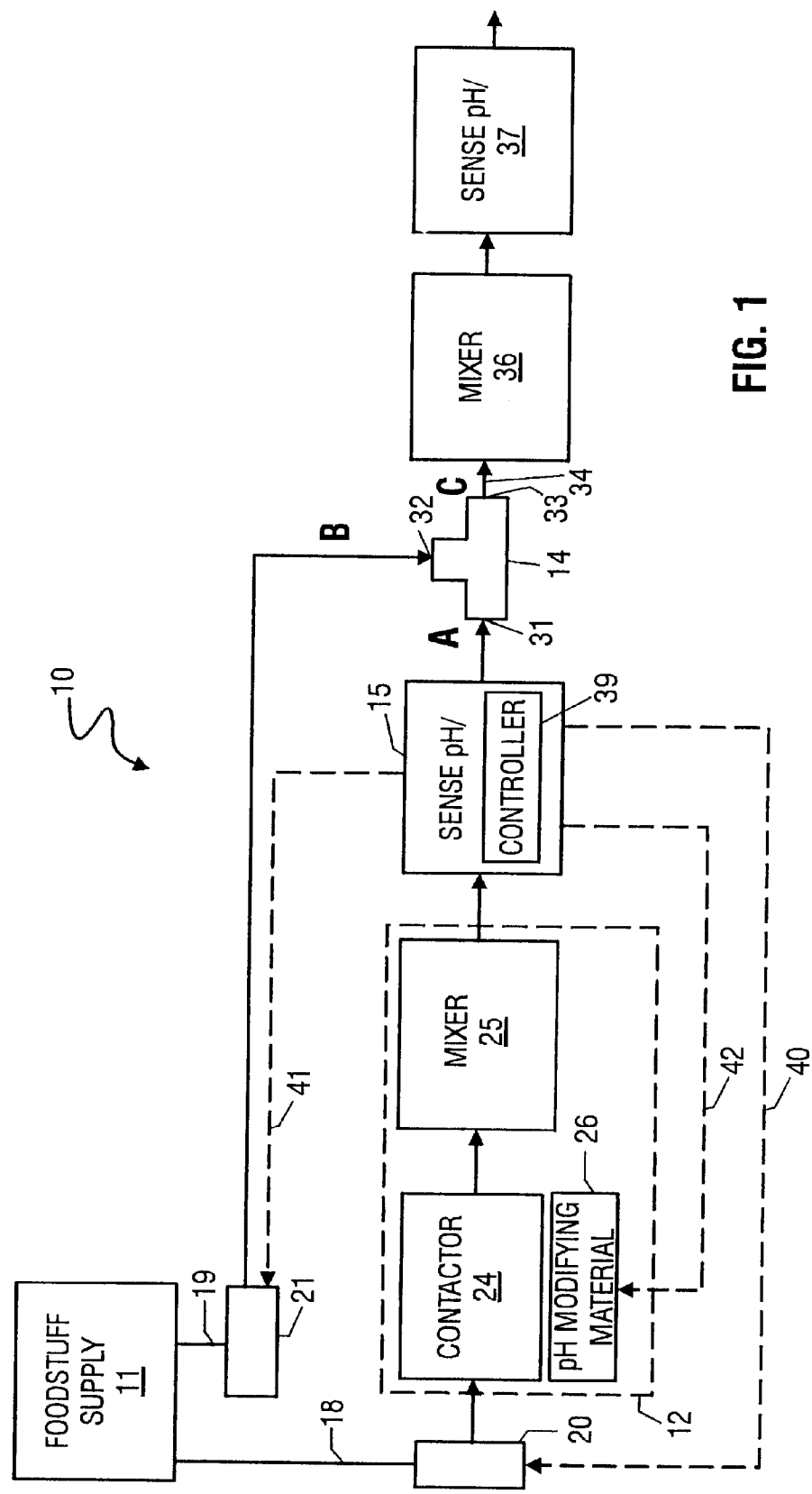
FIG. 1 is a diagrammatic representation of an apparatus embodying the principles of the invention for providing pH modification in a foodstuff.

Referring to FIG. 1, a pH modifying apparatus 10 embodying the principles of the invention includes an initial foodstuff supply 11 which feeds an initial foodstuff to two separate streams, labeled A and B in the figure. One stream of foodstuff, stream A, is processed through a pH modifying arrangement 12 and then the two streams A and B are combined in combining arrangement 14 to produce a third stream C in FIG. 2. The preferred form of the invention includes a pH sensing arrangement 15 for sensing the pH of the pH-modified foodstuff. This sensed pH is then used in determining the proportion at which the two streams A and B are mixed in combining arrangement 14 to produce the desired pH in the third stream C.

Stream A is carried in a first conduit 18 having an inlet connected to initial foodstuff supply 11 and an outlet connected to combining arrangement 14. Stream B is carried in a second conduit 19 having an inlet end connected to the initial foodstuff supply 11 and an outlet also connected to combining arrangement 14. A first pump 20 is connected in first conduit 18 for forcing material through the first conduit, while a second pump 21 is connected in second conduit 19 for forcing material through the second conduit. As will be described further below, these first and second pumps 20 and 21 are preferably variable rate pumps and may comprise auger-type pumps, piston-type pumps, or any other pumping device suitable for the particular foodstuff being processed. It will be appreciated that each pump 20 and 21 is driven with a suitable motor with controls for controlling the pumping speed. These motors and controls are within the knowledge of those skilled in the art and are omitted from the figures so as not to obscure the invention in unnecessary detail. Other details, such as the specific materials from which conduits 18 and 19 and other components of the system are formed, are likewise omitted from this disclosure since the materials may be any materials suitable for use in handling the desired foodstuffs.

Although any pH modifying arrangement may be used for the arrangement 12, the preferred arrangement comprises the arrangement shown in U.S. patent application Ser. No. 09/286,699, now U.S. Pat. No. 6,142,067. The entire disclosure of this document is incorporated herein by this reference. As shown in FIG. 1 of the present disclosure, pH modifying arrangement 12 includes a contactor 24 and a mixing device 25. Contactor 24 includes a supply 26 of pH modifying material. The pH modifying material may be any material suitable for use in the particular foodstuff being processed. For example, ammonia gas or aqueous solution of ammonia comprises a suitable pH increasing material for meats and other foodstuffs. Carbon dioxide provides a suitable pH reducing material. Regardless of the type of pH modifying material or the manner in which it is added to the foodstuff, mixing device 25 functions to distribute the material throughout the foodstuff to produce a generally uniform pH throughout the foodstuff. Mixing device 25 preferably comprises a grinder as set out in application Ser. No. 09/286,699, but may comprise any suitable mixing device.

The pH of the pH-modified foodstuff exiting mixer 25 is sensed at sensing arrangement 15. In the preferred form of the invention, sensing arrangement 15 includes a continuous sensing device for providing a continuous pH reading for the pH-modified foodstuff exiting mixer 25. The sensing device may sense material in situ within first conduit 18 or may sense only one or more small portions of the entire stream of material within the conduit. Alternatively to the preferred continuous sensing device, the sensing arrangement 15 may include an arrangement for taking discrete samples for manual testing. This manual sensing arrangement is within the scope of the following claims.

Referring still to FIG. 1, combining arrangement 14 includes a first inlet 31 connected to the outlet end of first conduit 18, and a second inlet 32 connected to the outlet end of second conduit 19. Combining arrangement 14 also includes a single outlet 33 connected to an outlet conduit 34. Some preferred embodiments of the invention may also include flow control or flow metering devices included in combining arrangement 14 for use in controlling the proportion at which the two foodstuff streams A and B are combined. This control may be in addition to, or an alternative to, any flow rate control provided through pumps 20 and 21 as discussed below.

Located downstream of combining arrangement 14, the illustrated form of the invention includes a mixer 36 for thoroughly mixing the combined stream of material exiting the combining arrangement. Since the combined stream C includes material from both streams A and B, the material must be mixed in order to provide the desired uniform pH throughout the material. Mixer 36 may comprise any suitable foodstuff mixing device. For comminuted meats, poultry, and seafood, for example, mixer 36 may comprise a grinder, blender, or bowl chopper. Regardless of the type of mixing device used for mixer 36, an outlet pH sensing arrangement 37 may be operatively connected in the outlet conduit 34 for measuring the pH of the combined stream C.

According to the invention, the pH sensed at sensing arrangement 15 may be used in controlling the overall pH modification within apparatus 10. In the preferred form of the invention, pH modifying arrangement 12 modifies the pH of the foodstuff in stream A over a desired modification amount. This overly modified pH may be brought back to a desired level in the combined stream C by adding under or non-pH-modified foodstuff from stream B in the appropriate proportion defined by the respective pH of the two streams. Since the initial foodstuff in stream B may be an untreated foodstuff with a generally known pH, while the pH after the pH modifying arrangement 12 may be varied, pH sensed at arrangement 15 comprises a variable which may be used through suitable control devices to control the proportion at which the two streams A and B are combined to produce the combined stream C at the desired pH.

The proportions at which the two streams of foodstuff A and B are combined may be controlled by controlling the flow rate of the two streams. FIG. 1 shows that the relative flow rates may be controlled by providing a control signal through line 40 to first pump 20. The control signal may originate from a controller 39 associated with pH sensing arrangement 15. FIG. 1 also shows a control line 41 extending from pH sensing arrangement 15 back to second pump 21. Either pump individually, or both pumps together may be controlled to control the proportion at which foodstuff streams A and B are combined in combining arrangement 14. Also, a third control line 42 may provide a control signal to contactor 24, or the supply 26 of pH modifying material associated with the contactor. This third control signal may be used along with other inputs to control the pressure of pH modifying material applied in contactor 24, or to control a metering of pH modifying material into the contactor.

The method of the invention and operation of apparatus 10 shown in FIG. 1 may be described with reference to FIG. 1 and the flow chart shown in FIG. 2. The method includes providing a first foodstuff such as stream A, and providing a second foodstuff such as stream B. The method also includes combining the two foodstuffs in a proportion to produce a third foodstuff at a desired pH, stream C.

Figure 2:
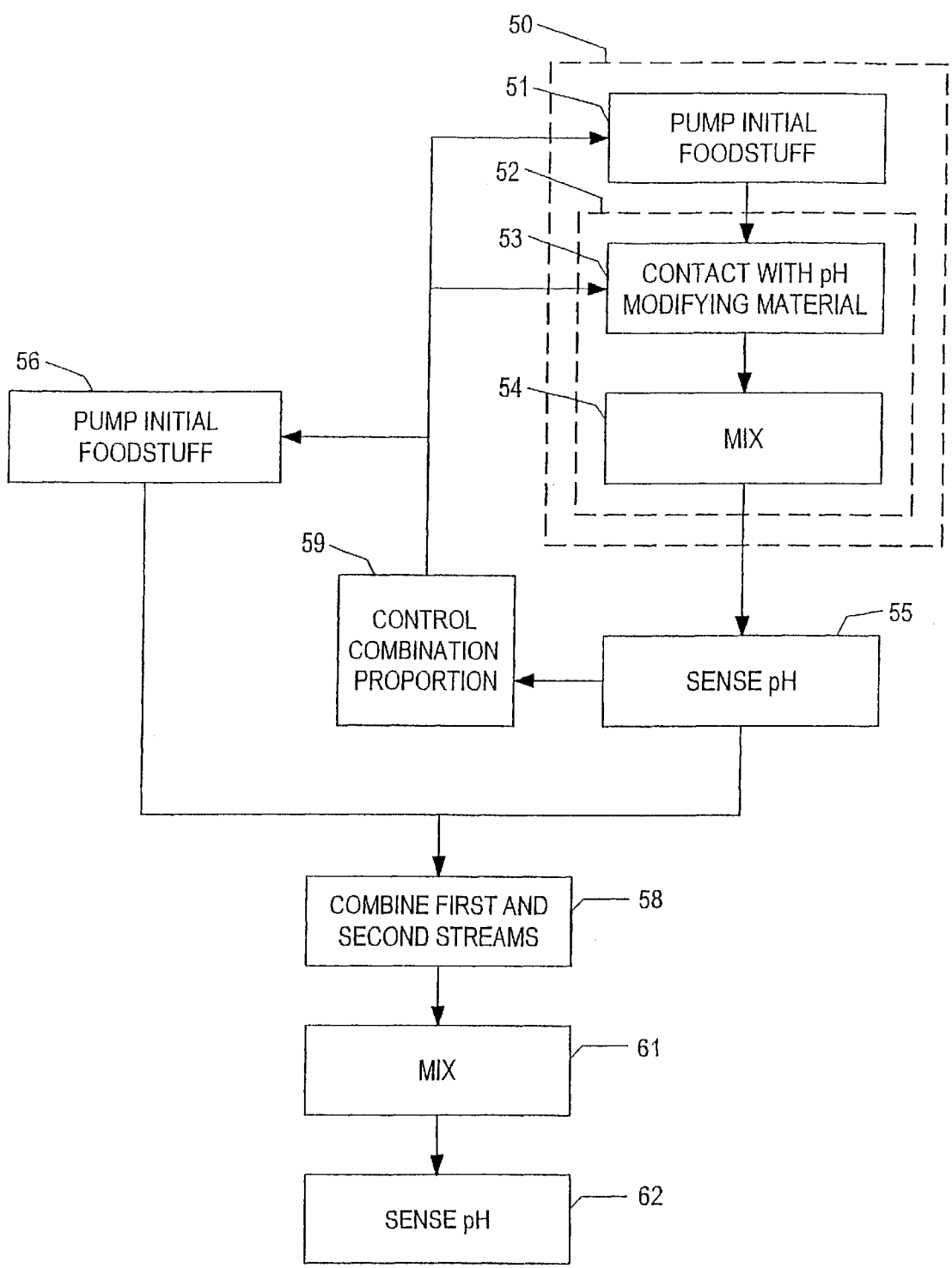
FIG. 2 is a flow chart showing the process steps according to the invention for controlling pH modification in a foodstuff.

Providing the stream of first foodstuff is shown generally at 50 in FIG. 2 and includes a pumping step 51 and pH modifying step 52. Pumping step 51 comprises pumping the initial foodstuff from supply 11 in FIG. 1 to pH modifying arrangement 12 using first pump 20. pH modifying step 52 comprises contacting the initial foodstuff with pH modifying material as shown at step 53, and then mixing the initial foodstuff and pH modifying material as shown at step 54. The method includes sensing the pH of the first foodstuff at step 55 for use in controlling the combination of the two foodstuff streams.

Providing the second foodstuff includes pumping foodstuff from the initial supply as shown at step 56 in FIG. 2. This pumping step is performed using second pump 21 shown in FIG. 1. It will be appreciated that the two streams of foodstuff may not be taken from a common supply as shown in FIG. 1. The second foodstuff shown as stream B in FIG. 1 may be material which is not pH-modified, or which is under modified. In any event, the second foodstuff has a pH which is opposite to a desired or target pH level with respect to the pH of the first foodstuff. Where the pH of the first foodstuff is higher than desired, the pH of the second foodstuff is lower than the desired, target pH level, and where the pH of the first foodstuff is lower than desired, the pH of the second foodstuff is higher than the target level.

The proportion at which the stream of first foodstuff and stream of second foodstuff is combined at step 58 depends upon the pH of the first and second foodstuffs and the desired final or target pH. FIG. 2 shows a single proportion control step 59. This control step may include controlling the flow rate of the first foodstuff in stream A in FIG. 1 through first pump 20. The control step may also or alternatively include controlling the flow rate of the second foodstuff in stream B in FIG. 1 through second pump 21. FIG. 2 also indicates that the control step may include controlling the addition of pH modifying material through a contactor (such as contactor 24 shown in FIG. 1). For example, the control step may include modifying the pressure at which pH modifying material is supplied to the contactor, or the flow rate of pH modifying material into the contactor.

FIG. 2 also shows mixing step 61 after combining step 58. This mixing may be performed as a separate step by a separate mixer such as mixing device 36 in FIG. 1, or by a mixing arrangement included in combiner 14. The purpose of the mixing at step 61 is to thoroughly blend the first and second foodstuffs together to form the third foodstuff having the target uniform pH. The pH of this third foodstuff may be checked at step 62 in FIG. 2 to ensure the desired pH level has been obtained.

Although the invention is described above with reference to a continuous pH modifying process, the method of the invention as defined in the following claims is not limited to a continuous process. The first and second foodstuffs may simply be combined together in a single batch and then mixed to produce a final mixed foodstuff having the target pH. Also, the pH-modified foodstuff such as the material exiting pH modifying arrangement 12 in FIG. 1 need not be combined immediately with the second foodstuff. Rather, the first or pH-modified foodstuff may be packaged and shipped to a remote mixing facility where it is combined and mixed with the second foodstuff in the proportion required to produce the target pH.

The preferred form of the invention utilizes an over-ammoniated foodstuff as the first foodstuff and an untreated foodstuff as the second foodstuff. The first foodstuff may be over ammoniated to raise the pH of the material over 7.0 to as much as 10.5, but preferably between 7.0 and no more than approximately 9.5. For example, a comminuted meat product such as lean finely textured beef "LFTB" may be over ammoniated to a pH of 9.0 and mixed in a 1 to 1.3 ratio by weight with ground beef at a pH of 5.5 to produce a mixed product (43% LFTB and 57% ground beef) having a pH of approximately 7. A lower pH in the LFTB would allow a higher percentage of LFTB to be used with ground beef in the mixed product to produce a mixed product having the desirable pH of approximately 7. As another example, LFTB over ammoniated to a pH of 8.0 may be mixed in a 1 to 0.7 ratio by weight with ground beef at a pH of 5.5 to produce a mixed product (59% LFTB and 41% ground beef) having a 7 pH.

The above described preferred embodiments are intended to illustrate the principles of the invention, but not to limit the scope of the invention. Various other embodiments and modifications to these preferred embodiments may be made by those skilled in the art without departing from the scope of the following claims.

I claim:

1. An apparatus for modifying the pH of a foodstuff, the apparatus including:
    (a) a pH modifying arrangement for receiving an initial foodstuff from an initial foodstuff supply and mixing the initial foodstuff with a pH modifying material to produce a first foodstuff having a first pH; and
    (b) a combining arrangement for receiving the first foodstuff and a second foodstuff having a second pH and for combining the first foodstuff and the second foodstuff in a proportion to produce a third foodstuff, the third foodstuff having a target pH different from the first pH and second pH.

2. The apparatus of claim 1 further including:
    (a) a pH sensing device operatively connected to sense the pH of the first foodstuff to provide a sensed pH; and
    (b) a control arrangement for receiving the sensed pH and being responsive to the sensed pH to control the proportion at which the first foodstuff is combined with the second foodstuff.

3. The apparatus of claim 1 wherein the pH modifying arrangement includes:
    (a) a contactor for adding the pH modifying material to the initial foodstuff; and
    (b) a grinder for grinding the initial foodstuff after addition of the pH modifying material.

4. The apparatus of claim 1 further including:
    (a) a first pump for pumping the initial foodstuff through the pH modifying arrangement and to the combining arrangement; and
    (b) a second pump for pumping the second foodstuff to the combining arrangement.

5. The apparatus of claim 4 further including:
(a) a pH sensing device operatively connected to sense the pH of the first foodstuff to provide a sensed pH; and
(b) a control arrangement for receiving the sensed pH and being responsive to the sensed pH to control the pumping rate of the first pump or the second pump.

6. The apparatus of claim 1 further including a combiner grinder included with the combining arrangement for grinding together the first foodstuff and second foodstuff.

7. An apparatus for controlling pH in a foodstuff, the apparatus including:
(a) a first conduit having an outlet end connected to an outlet conduit and an inlet end connected to a foodstuff supply;
(b) a first pump operatively connected in the first conduit for pumping material from the foodstuff supply to the outlet end of the first conduit;
(c) a pH modifying arrangement connected in the first conduit between the first pump and the outlet end of the first conduit;
(d) a second conduit having an outlet end connected to the outlet conduit and an inlet connected to the foodstuff supply; and
(e) a second pump operatively connected in the second conduit for pumping material from the foodstuff supply to the outlet end of the second conduit.

8. The apparatus of claim 7 further including a pH sensing device connected to sense the pH of material in the first conduit between the pH modifying arrangement and the outlet end of the first conduit.

9. The apparatus of claim 8 further including a control device operatively connected with the pH sensing device for controlling the relative pump rates between the first pump and second pump in response to the pH sensed by the pH sensing device.

10. The apparatus of claim 8 further including a control device operatively connected with the pH sensing device for controlling the application of a pH modifying material through the pH modifying arrangement in response to the pH sensed by the pH sensing device.

11. The apparatus of claim 7 further including a mixing device operatively connected to the outlet conduit for mixing the contents of the outlet conduit.

12. The apparatus of claim 11 wherein the mixing device comprises a grinder.

13. An apparatus for producing a pH-modified comminuted meat, the apparatus including:

(a) a pH modifying arrangement for receiving an initial comminuted meat from an initial material supply and mixing the initial comminuted meat with a pH modifying material to produce a first comminuted meat having a first pH; and
(b) a combining arrangement for receiving the first comminuted meat and a second comminuted meat having a second pH, and for combining the first comminuted meat and the second comminuted meat in a proportion to produce a third comminuted meat, the third comminuted meat having a target pH different from the first pH and second pH.

14. The apparatus of claim 13 further including:
(a) a pH sensing device operatively connected to sense the pH of the first comminuted meat to provide a sensed pH; and
(b) a control arrangement for receiving the sensed pH and being responsive to the sensed pH to control the proportion at which the first comminuted meat is combined with the second comminuted meat.

15. The apparatus of claim 13 wherein the pH modifying arrangement includes:
(a) a contactor for adding the pH modifying material to the initial comminuted meat; and
(b) a grinder for grinding the initial comminuted meat after addition of the pH modifying material.

16. The apparatus of claim 13 further including:
(a) a first pump for pumping the initial comminuted meat through the pH modifying arrangement and to the combining arrangement; and
(b) a second pump for pumping the second comminuted meat to the combining arrangement.

17. The apparatus of claim 16 further including:
(a) a pH sensing device operatively connected to sense the pH of the first comminuted meat to provide a sensed pH; and
(b) a control arrangement for receiving the sensed pH and being responsive to the sensed pH to control the pumping rate of the first pump or the second pump.

18. The apparatus of claim 13 further including a combiner grinder included with the combining arrangement for grinding together the first comminuted meat and the second comminuted meat.

* * * * *